(12) United States Patent
Chmaytelli et al.

(10) Patent No.: US 7,203,967 B2
(45) Date of Patent: Apr. 10, 2007

(54) METHODS AND APPARATUS FOR CONTENT PROTECTION IN A WIRELESS NETWORK

(75) Inventors: Mazen Chmaytelli, San Diego, CA (US); Laurence Lundblade, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 358 days.

(21) Appl. No.: 10/660,037

(22) Filed: Sep. 10, 2003

(65) Prior Publication Data
US 2005/0055574 A1   Mar. 10, 2005

(51) Int. Cl.
  *G06F 7/04*   (2006.01)
  *H04L 9/00*   (2006.01)
  *H04L 9/32*   (2006.01)

(52) U.S. Cl. .................. 726/30; 726/3; 726/4; 726/29; 713/168; 713/176; 380/202; 709/238

(58) Field of Classification Search ...................... None
See application file for complete search history.

(56) References Cited

U.S. PATENT DOCUMENTS

| | | | | |
|---|---|---|---|---|
| 4,055,746 A | 10/1977 | Peterson | .................... | 235/61.7 |
| 5,734,719 A | 3/1998 | Tsevdos et al. | ................. | 380/5 |
| 5,852,810 A | 12/1998 | Sotiroff et al. | ................. | 705/27 |
| 6,289,455 B1 | 9/2001 | Kocher et al. | ............... | 713/194 |
| 6,389,402 B1 | 5/2002 | Ginter et al. | .................. | 705/51 |
| 6,519,571 B1 | 2/2003 | Guheen et al. | ................ | 705/14 |
| 6,571,221 B1 | 5/2003 | Stewart et al. | ................. | 705/52 |
| 6,650,894 B1 * | 11/2003 | Berstis et al. | ................ | 455/420 |
| 6,983,139 B2 * | 1/2006 | Dowling et al. | ............ | 709/219 |
| 2002/0055924 A1 * | 5/2002 | Liming | ........................ | 707/100 |
| 2002/0188842 A1 | 12/2002 | Willeby | | |
| 2003/0041167 A1 * | 2/2003 | French et al. | ................ | 709/238 |
| 2003/0061132 A1 | 3/2003 | Yu, Sr. et al. | | |
| 2003/0110130 A1 | 6/2003 | Pelletier | | |
| 2004/0111640 A1 * | 6/2004 | Baum | ......................... | 709/224 |

\* cited by examiner

*Primary Examiner*—Gilberto Barron, Jr.
*Assistant Examiner*—A. Nobahar
(74) *Attorney, Agent, or Firm*—Robert J. O'Connell; Fariba Yadegar-Bandari

(57) ABSTRACT

Methods and apparatus for content protection in a wireless network. A method is provided for operating a protection system to protect an application from unauthorized distribution, wherein the application will fail to operate on a device that is outside a predetermined operating region. The method includes associating a geographic identifier with the application, wherein the geographic identifier identifies the predetermined operating region, and downloading the application and the geographic identifier to the device. The method also includes receiving a request to execute the application on the device, wherein the request includes the geographic identifier, and determining a device location. The method also includes comparing the device location with the predetermined operating region identified by the geographic identifier, and preventing the application from executing when the device is outside the predetermined operating region.

15 Claims, 4 Drawing Sheets

| Region Indentifier | Application Identifier | Geographic Indicator |
|---|---|---|
| Region 1 | Application 1 | Indicator 1 |
| | | Indicator 2 |
| | | |
| | Application 2 | Indicator 3 |
| | | Indicator 4 |
| | | |
| Region 2 | Application 5 | Indicator 7 |
| | | Indicator 8 |
| | | |
| | Content 1 | Indicator 12 |
| | | Indicator 13 |
| | | |

FIG. 4

METHODS AND APPARATUS FOR CONTENT PROTECTION IN A WIRELESS NETWORK

BACKGROUND

I. Field

The present invention relates generally to the operation of data networks, and more particularly, to methods and apparatus for protecting content in a wireless data network.

II. Description of the Related Art

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

One example where there is an increasing demand for network resources is in wireless network environments. In wireless environments, a variety of wireless devices, such as wireless telephones, personal digital assistants (PDAs), and paging devices, communicate over a wireless network. The wireless network may also include network servers that operate to provide various network resources to the wireless devices. Furthermore, the wireless networks may also be coupled to a public network, such as the Internet, so that resources on the public network can be made available to the wireless devices on the wireless network.

One area of concern for application and content developers is that of content protection. Content protection is becoming very important in wireless networks due to the improvements in air-link data speeds and the proliferation of end-users purchasing applications and related content via wireless devices. For example, applications and content purchased by one device user can be easily distributed to other device users. As a result, it is possible for device users to avoid paying various purchase and license fees to application and content developers. Thus, application developers and content providers must address the problem of having their applications or content pirated and/or distributed to other wireless devices or desktop computers without receiving the associated fees.

Therefore, what is needed is a system that operates to protect applications and content from unauthorized acquisition, operation, and/or distribution.

SUMMARY

In one or more embodiments, a protection system comprising methods and apparatus is provided that operates to protect content available on a data network from unauthorized acquisition, operation, and/or distribution. For example, in one embodiment, an application or content distribution server (server) is able to limit the purchaser of the application or content to operation within a predefined geographic location. Once the purchaser's device is outside the predefined location, the application or content will not be accessible from the server.

In one embodiment, the server flags "high value" applications or content for usage restriction within a predefined geographic region. Thus, the application or content is provided with a geographic privilege that can be based on any one of a variety of geographic identifiers. For example, the geographic privilege can be based on a global positioning system (GPS) location, a base station location, a system identifier (SID), a network identifier (NID), an area code, or other geographic identifier.

Once the geographic privilege is enable upon the application or content download, the end-user is restricted to running the application or viewing the content only within the region identified by the geographic identifier. Thus, the application and/or content are protected from unauthorized acquisition, operation or distribution because they are only available within predetermined regions and therefore cannot be used by devices that are outside the region.

In one embodiment, a method is provided for operating a protection system to protect an application from unauthorized distribution, wherein the application will fail to operate on a device that is outside a predetermined operating region. The method comprises associating a geographic identifier with the application, wherein the geographic identifier identifies the predetermined operating region, and downloading the application and the geographic identifier to the device. The method also comprises receiving a request to execute the application on the device, wherein the request includes the geographic identifier, and determining a device location. The method also comprises comparing the device location with the predetermined operating region identified by the geographic identifier, and preventing the application from executing when the device is outside the predetermined operating region.

In another embodiment, apparatus is provided that operates to protect an application from unauthorized operation, wherein the application will fail to operate on a device that is outside a predetermined operating region. The apparatus comprises a geographic database that operates to associate the application with a geographic indicator that identifies the predetermined operating region. The apparatus also comprises processing logic that operates to match a device location with the predetermined operating region identified by the geographic indicator to determine whether the device is outside the predetermined operating region, wherein if the device is outside the predetermined operating region the application is prevented from operating.

In another embodiment, apparatus is provided that operates to protect an application from unauthorized operation, wherein the application will fail to operate on a device that is outside a predetermined operating region. The apparatus comprises means for associating the application with a geographic indicator that identifies the predetermined operating region, and means for matching a device location with the predetermined operating region identified by the geographic indicator. The apparatus also comprises means for determining whether the device is outside the predetermined operating region, and means for preventing the application from operating if the device is outside the predetermined operating region.

In another embodiment, a computer-readable media is provided that comprises instructions that when executed by a processor in a protection system operate to protect an application from unauthorized operation, wherein the application will fail to operate on a device that is outside a predetermined operating region. The computer-readable media comprises instructions for associating the application with a geographic indicator that identifies the predetermined operating region, and instructions for matching a device location with the predetermined operating region identified by the geographic indicator. The computer-readable media also comprises instructions for determining whether the device is outside the predetermined operating region, and instructions for preventing the application from operating if the device is outside the predetermined operating region.

Other aspects, advantages, and features of the present invention will become apparent after review of the hereinafter set forth Brief Description of the Drawings, Detailed Description of the Invention, and the claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein:

FIG. 4 shows one embodiment of a geographic database for use with the protection system of FIG. 2.

DETAILED DESCRIPTION

The following detailed description describes a protection system that operates to protect applications and content from unauthorized acquisition and/or distribution. In one embodiment, the system operates to assign a geographic privilege to selected applications and content available at a content server. For example, the geographic privilege identifies a geographic boundary (or region) that is used to limit the operation of the application or content. The geographic boundary can define a region, country, state, city, district within a city, or any other geographic location.

In one embodiment, the content server that provides the application or content informs the purchaser of the application or content that a geographic restriction exists. The purchaser is then able to specify a geographic boundary in which that application or content is to be used. For example, the purchases may select one of several predefined regions in which the application or content is to be used. Once the geographic privilege is associated with the application or content, it will only operate within the selected region. Thus, in one embodiment, should the user attempt to run the application or content outside the selected region, the user is informed that the application or content is unavailable since the device is outside the selected region. Once the user moves the device back inside the selected region, the application or content becomes available again.

In one or more embodiments, the protection system is suitable for use with a variety of wired or wireless devices. For example, the wireless devices may be any type of wireless device, including but not limited to, a wireless telephone, pager, PDA, email device, tablet computer, or other type of wireless device.

Figure 1:
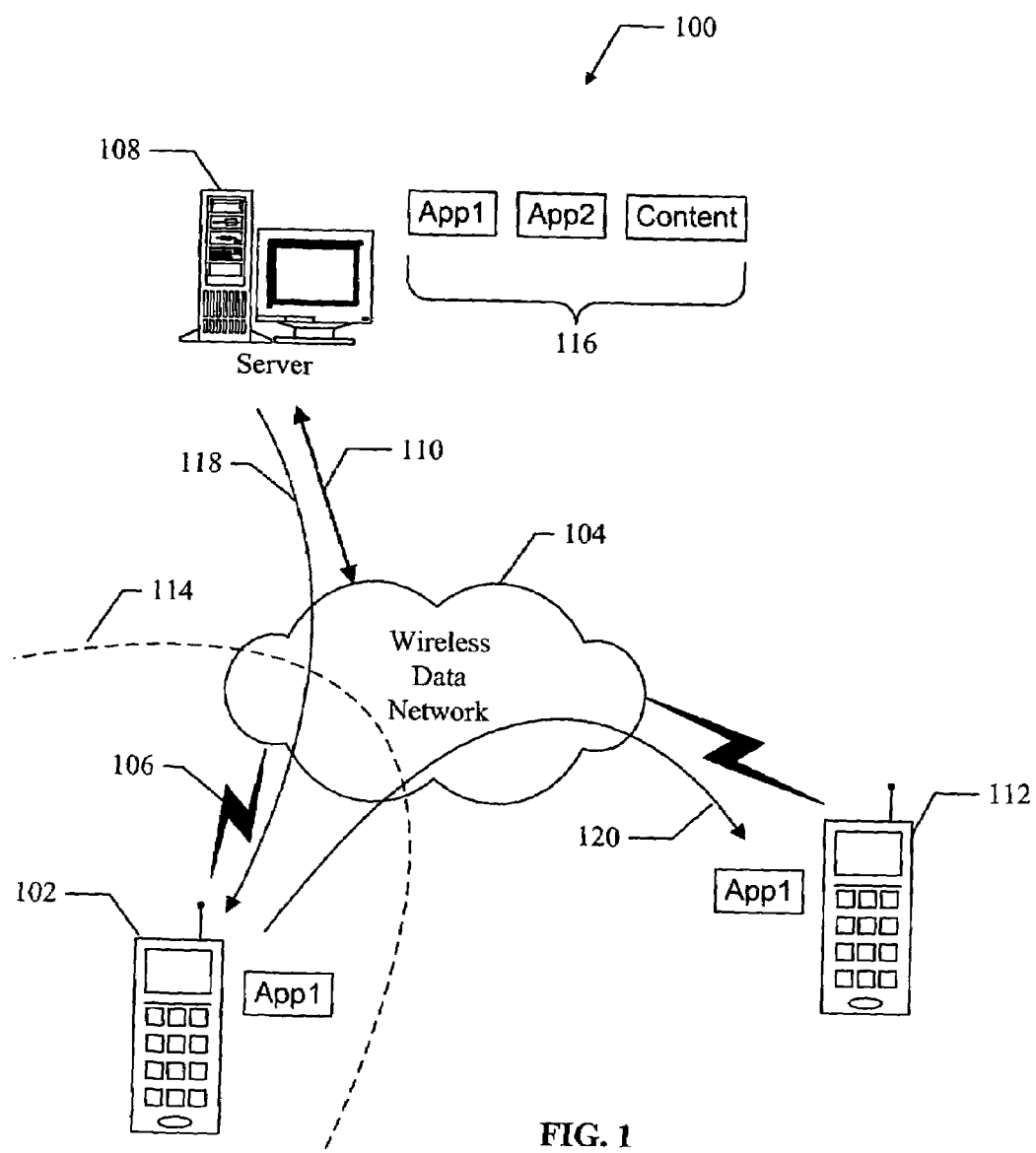
FIG. 1 shows a data network that comprises one embodiment of a protection system for protecting applications or content from unauthorized acquisition and/or distribution.

FIG. 1 shows a data network 100 that comprises one embodiment of a protection system for protecting applications or content from unauthorized acquisition and/or distribution. The network 100 comprises a wireless device 102 that communicates with a wireless data network 104 via a wireless communication channel 106. The network 100 also comprises a server 108 that operates to provide services to the wireless device 102 and other entities in communication with the network 104. The server 108 is coupled to the network 104 by link 110, which may be any type of wired or wireless link. For example, in one embodiment, the wireless device 102 may be a wireless telephone, and the server 108 may be part of a nationwide telecommunications network that provides applications and/or multimedia content to the device 102. Also coupled to the network 104 is a second wireless device 112 that is located in a different geographic from the device 102.

During operation of the protection system, content provided by the server 108 to the device 102 is protected so that the content is only accessible when the device 102 is in a selected geographic area. For example, in one embodiment, the server 108 includes various applications and content 116 that are available for download to the device 102. The device 102 contacts the server 108 and requests to download an application, for example, the application Appl. The server 108 "tags" or marks the application with a geographic indicator and transmits the application Appl to the device 102 as shown at path 118. The geographic indicator indicates that the application Appl may be operational or accessible when the device 102 is within a geographic region defined by the boundary 114. As long as the device 102 remains within the geographic region defined by the boundary 114, Appl will be accessible to the device 102. If the device 102 moves outside the bounded region, Appl will be disabled or not accessible.

If the device 102 transmits the application Appl to the device 112, for example, by transmitting the application over path 120, the application will fail to function, because device 112 is outside the region defined by the boundary 114. Thus, the protection system operates to protect applications and content from unauthorized distribution because if the application or content is distributed to a device outside a predefined region associated with the application or content, it will fail operate or it will not be accessible to that device.

Figure 2:
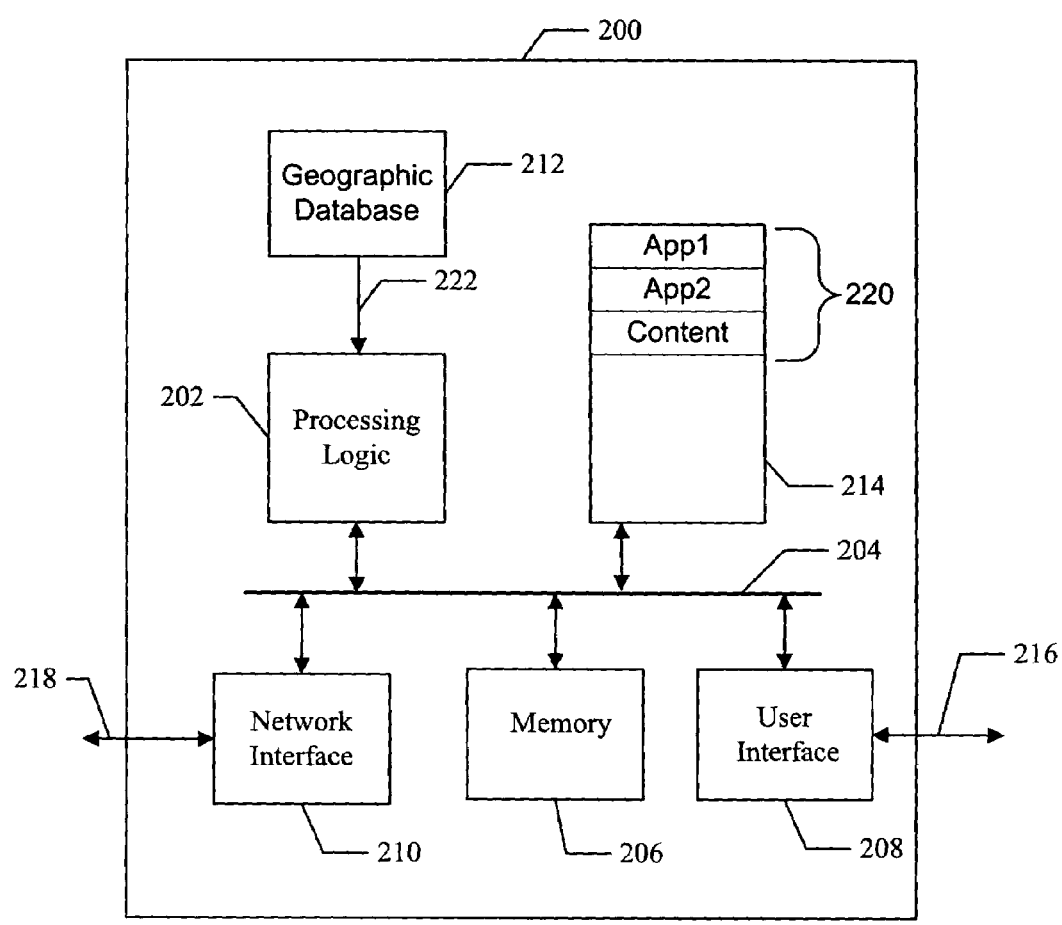
FIG. 2 shows a functional block diagram illustrating one embodiment of a protection system that operates to protect applications and content from unauthorized acquisition and/or distribution.

FIG. 2 shows a functional block diagram illustrating one embodiment of a protection system 200 that operates to protect applications and content from unauthorized acquisition and/or distribution. For example, the protection system 200 is suitable for use in conjunction with or as part of the server 108 to protect applications and content available at the server that are downloaded to the wireless device 102.

The protection system 200 comprises processing logic 202 that is coupled to an internal data bus 204. Also coupled to the internal data bus 204 are memory 206, user interface 208, and I/O interface 210. The protection system 200 also comprises a geographic database 212 coupled to the processing logic 202 and an application memory 214 coupled to the internal bus 204. The application memory 214 comprises one or more applications or other content 220 that is available for download.

In one or more embodiments, the processing logic 202 comprises a CPU, gate array, hardware logic, software, or a combination of hardware and software. Thus, the processing logic 202 generally comprises logic to execute machine-readable instructions.

The memory 206 comprises RAM, ROM, FLASH, EEROM, or any other suitable type of memory, or a combination thereof. In one embodiment, the memory 206 is located internal to the integrity system 200, and in another embodiment, the memory 206 comprises a removable memory card or memory device that may be selectively attached to the integrity system 200, and thereby couple to the internal bus 204. Thus, the memory 206 may comprise virtually any type of memory that is capable of storing instructions that may be executed by the processing logic 202.

The user interface 208 receives user input 216, for example, from a keypad, pointing device, touch pad, or other input mechanisms to allow a user to interact with the device 102. The user interface 208 may also couple to a display device, such as a CRT, LCD, LED, or any other type of display device to provide a visual display to the user. Any other type of input or output device may also be coupled to the user interface 208, such as, disk storage, audio logic, video devices, etc.

The I/O interface 210 operates to transmit and receive information between the protection system 200 and external devices, systems, and/or networks using the communication link 218. For example, in one embodiment, the network interface 210 comprises a radio transceiver circuit (not shown) that operates to transmit and receive information over a wireless data network using the communication link 218. For example, the communication link 218 may be the communication link 106 shown in FIG. 1. For example, the transceiver comprises circuitry that modulates information received from the processing logic 202 and converts the modulated information into high frequency signals suitable for wireless transmission. Similarly, the transceiver also comprises circuitry to convert received high frequency communication signals into signals suitable for demodulation and subsequent processing by the processing logic 202.

In another embodiment, the I/O interface 210 comprises a transceiver that operates to transmit and receive information over a hardwired communication link, such as a telephone line, or other type of data line, to communicate with a remote system on a public data network, such as the Internet.

In still another embodiment, the I/O interface 210 comprises circuitry that operates to communicate with local devices, such as a local workstation. The I/O interface 210 may also include circuitry (such as serial or parallel port logic) to communicate with a printer or other local computer or device, such as floppy disk or memory card. Thus, the I/O interface 210 may comprise any type of hardware, software, or combination thereof to allow the integrity system 200 to communicate with other local or remotely located devices or systems.

In one embodiment, the geographic database 212 comprises a CPU, processor, logic, memory, software, or any combination of hardware and software. The geographic database 212 is coupled to the processing logic via the link 222 and operates to provide geographic indicators to the processing logic 202. The geographic indicators identify one or more geographic regions that may be associated with the applications and content 220. For example, the geographic indicators are used by the processing logic 202 to tag or mark an application or content for operation within a selected geographic region. After the application or content is tag with a geographic indicator, the application or content is transmitted to the device 102, and as a result, the application or content will only operate or be accessible to the device 102 when the device is located within the selected geographic region indicated by the associated geographic indicator.

It should be noted that the configuration of the protection system 200 is just one configuration suitable for implementing one embodiment of the protection system 200. It is also possible to implement the protection system 200 using other functional elements or element configurations within the scope of the present invention.

During operation of the protection system 200, the processing logic 202 executes program instructions stored in the memory 206 to perform the functions described herein. For example, in one embodiment, the protection system 200 performs the described functions when the processing logic 202 executes program instructions stored in the memory 206. In another embodiment, the program instructions are stored on a computer-readable media, such as a floppy disk, CD, memory card, FLASH memory device, ROM, or any other type of memory device. The program instructions are loaded into the memory 206 via the I/O interface 210. For example, the protection system 200 may download the program instructions from the computer-readable media into the memory 206 via the I/O interface 210.

Figure 3:
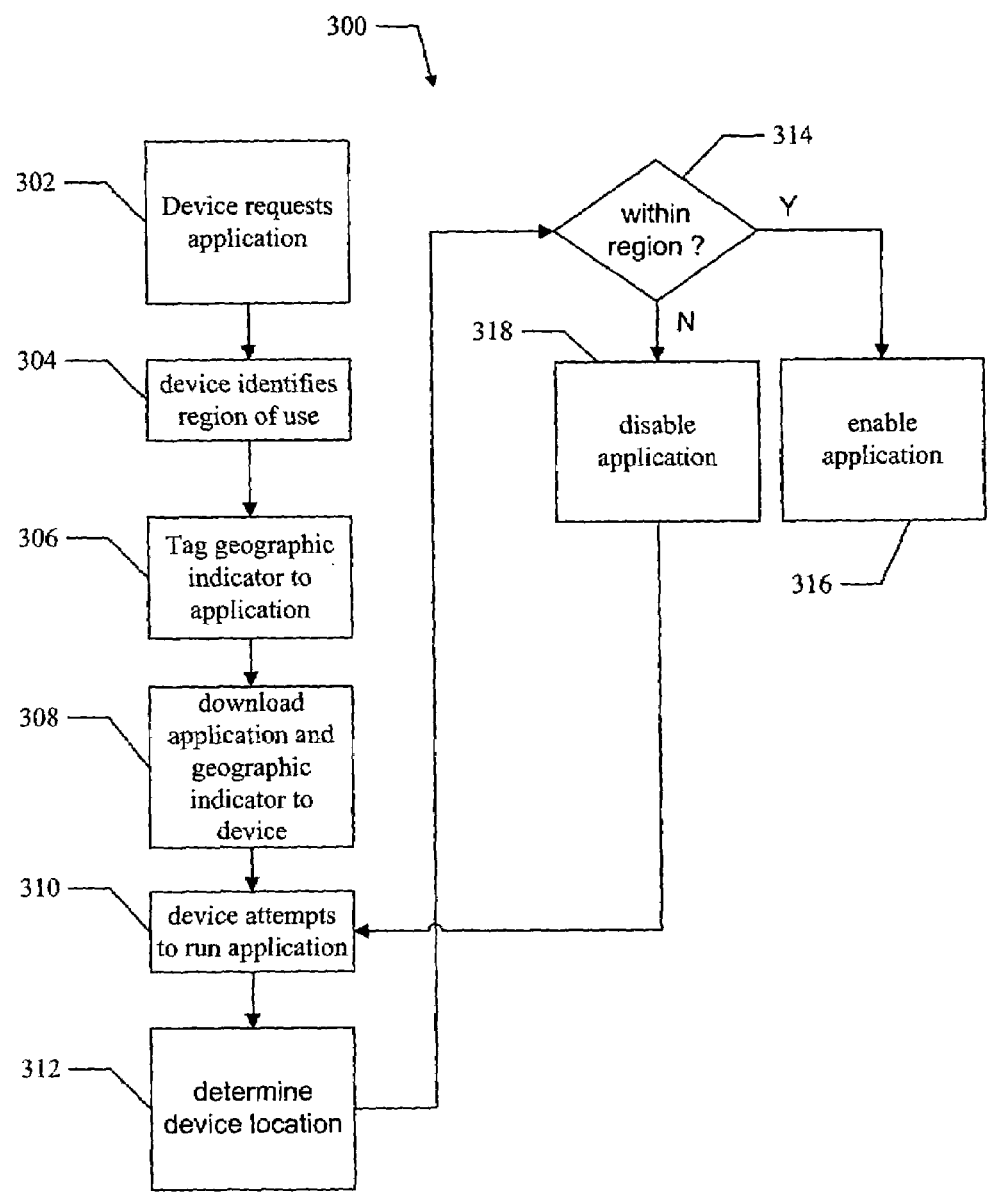
FIG. 3 shows one embodiment of a method for operating a protection system to protect applications or content from unauthorized acquisition and/or distribution.

FIG. 3 shows one embodiment of a method 300 for operating a protection system, for example, the protection system 200 to protect applications or content from unauthorized acquisition and/or distribution. For example, the method 300 will be described with reference to the protection system 200 shown in FIG. 2. It will be assumed that the protection system 200 is coupled to a data network so that the system 200 may communication with a client device, for example, the device 102.

At block 302, the device sends a request to obtain an application or multimedia content. For example, the device 102 sends a request to the protection system via the wireless network 104.

At block 304, the protection system operates to query the device as to what geographic area the application will be used in. In one embodiment, the device user is provided with a dialog box that allows the device user to select from a list of regions where the application may be used. For example, the protection system communicates with the device 102 via the wireless network 104, and responses entered by the device user are transmitted back to the protection system over the same network path.

At block 306, the protection system receives the region selection from the device user and operates to tag the desired application with a geographic indicator representative of the selected region. For example, the processing logic 202 retrieves the selected application from the memory 214 and retrieves a geographic indicator from the database 212. The geographic indicator is generated based on the desired operating region provided by the device user. The processing logic 202 then tags the application with the geographic indicator. For example, in one embodiment, the geographic indicator may be a digital signature that is generated by the protection system that can be mapped to the desired operating region.

At block 308, the selected application and the geographic indicator are downloaded to the device. For example, the protection system downloads the tagged application to the device 102 via the wireless network 104.

At block 310, the device attempts to run the application on the device. When the application begins executing on the device, the application contacts the protection system. For example, the application may require information or other content before executing on the device 102. The application contacts the protection system to request the information and provides the geographic indicator that was tagged to the application.

At block 312, the protection system receives the device's request, and in response, the protection system determines device location. For example, in one or more embodiments, the protection system determines the location of the device 102 by using a global positioning system (GPS) location, a base station location, a system identifier (SID), a network identifier (NID), an area code, or other device location information that may be available.

At block 314, the protection system performs a test to see if the location of the device is within the predefined geographic location that is associated with the application the device is attempting to run. For example, the protection system uses the geographic indicator to determine the authorized operating region for the application. For example, the processing logic 202 uses the geographic indicator to access the database 212 to map back to the authorized operating region for the application. The processing logic then matches the device location and the authorized operating region to see if the device is located within the authorized region. For example, the processing logic uses any type of matching technique to match the device location and the authorized operating region. If the device is within the authorized region, the method proceeds to block 316. If the device is not within the authorized region, the method proceeds to block 318.

At block 316, the protection system determines that the device is within the authorized geographic region operates to allow the device to run the application. For example, in one embodiment, the protection system may provide an authorization code to the application that allows the application to execute on the device 102. In another embodiment, the protection system may provide an authorization code to a network server that authorizes the server to provide requested services to the application. For example, the application may be a gaming application that receives real-time gaming information from the server after the server has received the authorization from the protection system.

At block 318, the protection system determines that the device is not within the authorized geographic region and therefore the protection system operates to prevent the application from executing on the device. For example, in one embodiment, the protection system fails to send an authorization code, or in the alternative, sends a disable code to the application that prevents the application from executing on the device 102. In one embodiment, the protection system fails to provide access to information requested by the application. For example, the protection system fails to authorize a network server to provide information to the application. Thus, if the application is a gaming program, the application will not receive the required real-time gaming information in order to execute properly on the device 102. As a result, because the device is outside the authorized operating region, the application will fail to execute properly, and therefore the application is protected from distribution outside the authorized region.

The method 300 may optionally proceed to block 310 if the device user has moved the device into the authorized region and attempts to run the application. At block 310, the process of determining if the device is with the authorized region begins again. Thus, if the device is moved back into the authorized region, the protection system will allow the application to function as designed.

FIG. 4 shows one embodiment of a geographic database 400 for use with the protection system 200 of FIG. 2. The database 400 is used by the protection system 200 to map authorized geographic regions to applications by using a geographic indicator. The database 400 comprises a region identifier 402, an application identifier 404, and a geographic indicator 404.

The region identifier 402 identifies a region in which an application is authorized to operate. For example, the region identifier 402 may define by a region, country, state, city, district within a city, or any other geographic location. The application identifier 404 identifies a particular application or content that is available for execution on a device. For example, a variety of application types may be available, such as gaming programs, news services, movie or other video content, or audio content.

The geographic indicator 406 provides a mechanism to map an application to an authorized operating region. The indicator 406 may be generated using any known technique. For example, in one embodiment, a device identifier, the application identifier, and the region identifier are used to form a digital signature that represents the geographic indicator. Any other application or device information may also be used to create the digital signature. During operation of the protections system, the application provides the geographic indicator to the protection system when the user attempts to execute the application on the device. The protection system then operates to generate another signature based on the device's current location. If the signatures match, the protection system allows the application to execute on the device.

A protection system has been described that includes methods and apparatus to protect applications and content from unauthorized acquisition and/or distribution. The system is suitable for use with all types of wireless devices and is especially well suited for use with mobile telephones operating on nationwide wireless telecommunication networks.

Accordingly, while one or more embodiments of methods and apparatus for a protection system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

I claim:

1. A method for operating a protection system to protect an application from unauthorized operation, wherein the application will fail to operate on a device that is outside a predetermined operating region, the method comprising:

associating a geographic identifier with the application, wherein the geographic identifier identifies the predetermined operating region;

after said associating, downloading the application and the geographic identifier to the device;

receiving a request to execute the application on the device, wherein the request includes the geographic identifier;

determining a device location;

comparing the device location with the predetermined operating region identified by the geographic identifier;

sending an authorization code to allow an execution of the application if the device is within the predetermined operating region; and preventing the application from executing when the device is outside the predetermined operating region, wherein the protection system generates a digital signature for the geographic identifier.

2. The method of claim 1, wherein the step of preventing comprises preventing the application from accessing information on a server.

3. The method of claim 1, wherein the device is a wireless device.

4. An apparatus that operates to protect an application from unauthorized operation, wherein the application will fail to operate on a device that is outside a predetermined operating region, the apparatus comprising:

a geographic database that operates to associate the application with a geographic indicator that identifies the predetermined operating region wherein a logic included in the geographic database generates a digital signature for the geographic indicator; and processing logic that operates to match a device location with the predetermined operating region identified by the geographic indicator to determine whether the device is outside the predetermined operating region, wherein if the device is outside the predetermined operating region the application is prevented from operating, and further wherein if the device is within the predetermined operating region, an authorization code is generated so as to allow the application to operate.

5. The apparatus of claim 4, further comprising transmission logic to transmit the application and the geographic indicator to the device.

6. The apparatus of claim 4, further comprising receiving logic to receive a communication from the application that includes the geographic identifier.

7. The apparatus of claim 4, wherein the device is a wireless device.

8. An apparatus that operates to protect an application from unauthorized operation, wherein the application will fail to operate on a device that is outside a predetermined operating region, the apparatus comprising:

means for associating the application with a geographic indicator that identifies the predetermined operating region;

means for matching a device location with the predetermined operating region identified by the geographic indicator;

means for determining whether the device is outside the predetermined operating region;

means for sending an authorization code to allow an execution of the application if the device is within the predetermined operating region; and means for preventing the application from operating if the device is outside the predetermined operating region, wherein a digital signature is generated for the geographic indicator.

9. The apparatus of claim 8, further comprising means for transmitting the application and the geographic indicator to the device.

10. The apparatus of claim 8, further comprising means for receiving a communication from the application that includes the geographic identifier.

11. The apparatus of claim 8, wherein the device is a wireless device.

12. A computer-readable media comprising instructions that when executed by a processor in a protection system operate to protect an application from unauthorized operation, wherein the application will fail to operate on a device that is outside a predetermined operating region, the computer-readable media comprising:

instructions for associating the application with a geographic indicator that identifies the predetermined operating region;

instructions for matching a device location with the predetermined operating region identified by the geographic indicator;

instructions for determining whether the device is outside the predetermined operating region;

instructions for sending an authorization code to allow an execution of the application if the device is within the predetermined operating region; and instructions for preventing the application from operating if the device is outside the predetermined operating region, wherein a digital signature is generated for the geographic indicator.

13. The computer-readable media of claim 12, further comprising instructions for transmitting the application and the geographic indicator to the device.

14. The computer-readable media of claim 12, further comprising instructions for receiving a communication from the application that includes the geographic identifier.

15. The computer-readable media of claim 12, wherein the device is a wireless device.

* * * * *